United States Patent
Otani et al.

(10) Patent No.: US 7,010,368 B2
(45) Date of Patent: Mar. 7, 2006

(54) PROGRAMMABLE CONTROLLER UNIT AND METHOD OF PROCESSING USER PROGRAM

(75) Inventors: Shuji Otani, Tagata-gun (JP); Toshiro Izumi, Odawara (JP)

(73) Assignee: OMRON Corporation, Kyoto (JP)

( * ) Notice: Subject to any disclaimer, the term of this patent is extended or adjusted under 35 U.S.C. 154(b) by 283 days.

(21) Appl. No.: 10/341,331

(22) Filed: Jan. 10, 2003

(65) Prior Publication Data

US 2003/0144753 A1    Jul. 31, 2003

(30) Foreign Application Priority Data

Jan. 10, 2002  (JP)  ............................. 2002-003954
Dec. 27, 2002  (JP)  ............................. 2002-382445

(51) Int. Cl.
*G05B 19/00* (2006.01)
*G06F 19/00* (2006.01)

(52) U.S. Cl. .................... 700/86; 700/18; 700/90

(58) Field of Classification Search .................. 700/1, 700/17, 18, 86, 90
See application file for complete search history.

(56) References Cited

U.S. PATENT DOCUMENTS

| | | | | |
|---|---|---|---|---|
| 5,295,059 A | * | 3/1994 | Brooks et al. | ................ 700/18 |
| 5,630,066 A | * | 5/1997 | Gosling | ....................... 709/221 |
| 5,655,154 A | * | 8/1997 | Jain et al. | .................... 719/310 |
| 5,671,420 A | * | 9/1997 | Bell et al. | .................... 717/167 |
| 6,009,268 A | | 12/1999 | Reis et al. | |
| 2003/0028690 A1 | * | 2/2003 | Appleby-Alis et al. | ........ 710/8 |

FOREIGN PATENT DOCUMENTS

| | | |
|---|---|---|
| JP | 08-286717 | 1/1996 |
| JP | 10-333900 | 12/1998 |

OTHER PUBLICATIONS

Examination Report dated May 13, 2005, Chinese patent application No. 03101426.7.

* cited by examiner

*Primary Examiner*—Jayprakash N. Gandhi

(74) *Attorney, Agent, or Firm*—Beyer Weaver & Thomas LLP

(57) ABSTRACT

A unit such as an I/O unit for a programmable controller stores a user program in a RAM but at least a portion of this user program is made into a library. At least a portion and maybe the whole of this user program is made into library and stored in a flash memory. The program thus made into a library can be executed when necessary but the flash memory is made in accessible by the tool and the program stored therein is protected from unauthorized person trying to read its content.

12 Claims, 10 Drawing Sheets

BACKUP FILE FORMAT (EXAMPLE)

| No | File Name | Notes |
|---|---|---|
| 1 | Unit**.prm | Library related data in unit flash memory, etc. |

**: Unit No.

FLAG OPERATION

| Flag Name | Function |
|---|---|
| Unit data upload | Write data in unit onto memory card when 0→1 |
| Unit data download | Read data from memory card when 0→1 |

STATUS DISPLAY

| Flag Name | Function |
|---|---|
| Memory card transmission error | ON when write on or read from memory card is in error |
| Transmission busy | Shown when transmission is busy. |

FIG. 12

FILE FORMAT ON MEMORY CARD

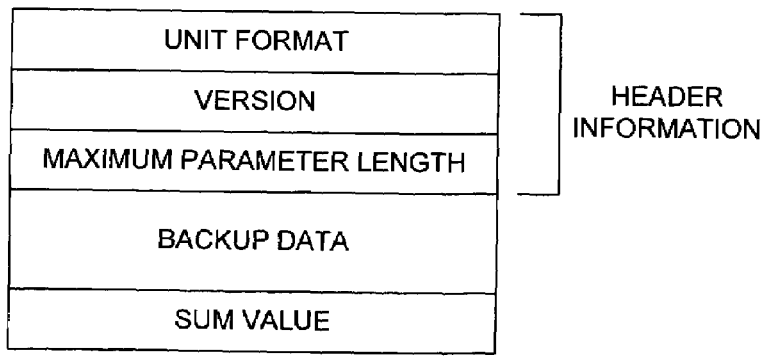

FIG. 13 ptimes # PROGRAMMABLE CONTROLLER UNIT AND METHOD OF PROCESSING USER PROGRAM

This application claims priority on Japanese patent applications 2002-3954 filed Jan. 10, 2002 and 2002-382445 filed Dec. 27, 2002.

BACKGROUND OF THE INVENTION

This invention relates to a programmable controller and its units, as well as a method of processing a user program.

As is well known, programmable controllers (PLCs) used in factory automation (FA) carry out controls by inputting ON/OFF data from input devices such as switches and sensors, carrying out logical operations according to a sequence program (user program) written, say, in the ladder language, and outputting signals on such ON/OFF data according to the results of such operations to output devices such as relays, valves and actuators. Dedicated tools are used when a user program is created or edited, written into (or downloaded to) a specified area of a PLC or read out (or uploaded) from a specified memory device.

Such a PLC may be formed by preparing a plurality of units each for a different function and connecting them electrically and mechanically. Examples of such units that form such a PLC include a power source unit for supplying electric power to each unit of the PLC, a CPU unit that carries out a user program stored in a program memory on the basis of input signals inputted by IN refresh, and an I/O unit that can communicate with the CPU unit through a bus and is connected to an input device or an output device.

Some recently developed I/O units have a CPU (or a MPU) and a program memory installed and desired user programs stored in such a program memory, adapted to carry out an intended control by having the user program carried out also on the side of the I/O unit.

Let us now consider the commercial flow route of PLCs and their individual units. Firstly, there are the makers that produce the PLCs. Producers of various industrial machines such as automatic packaging machines and injection molders buy PLCs from such a maker and have needed user programs created for the purposes of their industrial machines and their controls by means of program-creating tools. The user programs thus created are downloaded to the PLC and the industrial machine controlled by such a PLC is produced. In other words, the producer of such an industrial machine is a user (or an intermediate user) from the point of view of the maker of the PLC. Such an industrial machine may be installed in the factory of an end user as a part of a production system to produce products of various kinds.

Such user programs incorporate the know-how of individual intermediate users and hence are their important intellectual properties. Thus, each intermediate user has a strong desire to prevent as much as possible the contents of its user programs from becoming known to his/her business competitors. If a user program is created by using a multipurpose language such as the ladder language to describe sequence programs and is stored in a program memory, it is possible to use a tool to read out and analyze such a user program. It is often the case that several intermediate users are in a business relationship with a single end user and in such a situation, the factory of the end user may be freely accessible to each of the intermediate users. Thus, after an industrial machine controlled by a PLC is installed, a competing intermediate user different from the one who produced and delivered this machine may visit the site and upload the user program of its PLC.

In view of this possibility, a pass word may be incorporated so as to protect the program from being read out but if the pass word becomes known or if the program has been analyzed, the user program becomes available to any third party. When a pass word is used to protect the user program, there are both methods of read-protecting the entire program and methods of read-protecting only a selected portion of the program (partial protection). The intermediate user may choose to protect only the portion of the user program containing the know-how and sell such a partially protected product to the end user so as to prevent the dissemination of the know-know to be protected but to allow the other parts to be freely modified (customize) by the end user. This method, however, has the problem that the protected portion may be easily affected when an unprotected portion is edited since the protected portion is a part of the single user program.

If a dedicated microcomputer board is used for the control portion (such as for the control of motion) including the know-how, its leakage to a third party can be inhibited but there remains the cumbersome problem of preparing a dedicated component such as a microcomputer board. Since microcomputer boards cannot accommodate the ladder language or the sequence program language, the environment (including tools) for the development for user programs by the ladder language used by the PLC cannot be employed, and a dedicated environment becomes necessary for developing programs on the microcomputer board. This leads to the problem of an increased cost.

If the user cannot prepare a dedicated development environment or avail himself/herself of a developer for creating a program microcomputer board by means of a dedicated development environment, cooperation from another maker such as a maker of PLCs becomes necessary. In particular, when a user requests a maker of PLCs to create a program corresponding to a user program, the maker of PLCs can offer such a program by incorporating it in a system program (firmware) for the unit as a dedicated unit for the specified user. This method is desirable for the purpose of protection but the know-how to be protected must be disclosed to the program maker and it is not always easy for the program maker to fully understand the know-how even if it is carefully disclosed. So, the control and the functions desired by the user may not be fully realized by the created program, and the user may not find it possible to correct the program in a simple manner.

SUMMARY OF THE INVENTION

It is therefore an object of this invention to provide a unit, a programmable controller (PLC) and a method of processing a user program by which a part or the entirety of a program created by a user can be protected without separately preparing a dedicated environment for program development.

A unit for a PLC according to this invention may be characterized as comprising a first memory device that stores a user program, a second memory device mounted to the unit, library-creating means for creating a library out of at least a portion of the user program and storing the library in the second memory device, and program-executing means for executing a program made into the library stored in the second memory device and wherein the second memory device is inaccessible by a tool that uploads the user program.

In the above, "unit" means one of the units which comprise the PLC, having the function of downloading a user program created by the user, storing it inside the unit and executing it. The CPU unit and the I/O unit of the PLC are examples of the unit. Special function units such as master units for remote I/O including the function of executing user programs and carrying out a special function are other examples. The "first memory" may be a RAM and the "second memory" may be a flash memory, but two memory devices of the same type may be used for them. A single memory device may be divided into two parts with different areas, the part that is accessible by the tool being identified as the first memory and the part that is not accessible by the tool being identified as the second memory. Two memories may be used, each memory including an area not accessible by the tool and these areas inaccessible by the tool being together referred to as the second memory.

"To create a library" means to "make a program into the form of a library," or the process of converting a program into a form such that a program-executing means such as an MPU can call and execute and thereafter store it in a specified memory. As an example, a portion of the processing to be executed may be made into a program in the form of a subroutine as a block of specified processes and this subroutine program may be called from a program for processing the entire subroutine program and executed.

A program made into the form of a part library may be executed, for example, by preliminarily assigning an identification symbol, storing the program in a specified memory (the "second memory" such as a flash memory) and inserting the identification symbol and a dedicated command into the main program. As this main program is scanned, the inserted dedicated command is executed and the program identified by the identification symbol is retrieved from the specified memory and executed.

The "library-creating means" corresponds to the means for carrying out, for example, the processes shown in the flowchart shown in FIG. 4. The "program-executing means" corresponds to the means for carrying out, for example, the processes shown in FIGS. 8, 9 and 10.

"To make inaccessible by a tool" means to design such that the content stored in a memory device cannot be read out by the tool. "To make the second memory device inaccessible by a tool" therefore means that, when the tool transmits to the unit a command to retrieve a user program or other data, the unit (or its processing means such as an MPU) serves to retrieve only the portion of the requested data stored in the first memory device (or the memory devices other than the second memory device). As a practical example, rules governing the tool and the unit may be set by the PLC maker such that only the first memory device has memory areas that can respond to a command from the tool to retrieve data and the second memory device cannot respond to such a command from the tool. In other words, commands for writing in and reading from the first memory device are regularly prepared but no command for writing in or reading from the second memory device is prepared. As another example, the tool may be allowed to "access" the second memory device but the rules may be so set that the inner system of the second memory device does not allow its data to be retrieved. According to this example, the unit itself is so set that no data can be read from a part of the memory devices (the second memory device). By either example, programs to be protected are not left in the first memory device but stored only in the second memory device. In summary, a forbidden part is created within the unit and the programs to be protected are stored only within such part.

According to the embodiment to be described below, a library data memory area and a library information memory area are the forbidden areas and the programs to be protected are made into the form of a library.

According to this invention, at least a portion of a user program is made into the form of a library and stored in the second memory device not accessible by the tool and hence the user program becomes incapable of accessing the program made into a library. Thus, programs made into a library to be kept secret such as the user's know-how can be dependably protected. While the operation for converting a program into a library is being carried out, the program being converted remains as a specified portion of the user program stored in the first memory device and hence the user can create the program by using the environment for the development of the original user program. In other words, no special environment is required for making a library and the protection can be dependably effected after the library is created.

Within the context of the invention, "a portion of the program" means a portion of the user program before made into the form of a library and stored in the first memory device. The portion to be made into a library and the portion not to be made into a library are distinguished by whatever means. "The whole of the user program" means the whole of the user program stored in the first memory device to be made into a library. Even where a part library is to be created, if only one or more subroutine programs to be made into the part library are stored in the first memory device and made into a library to be stored in the second memory device, it is the whole of a user program stored in the first memory device that is made into a library.

The aforementioned library-creating means can further function to convert a user program into the form of an execution object for storing in the second memory device. In the above, "to convert into the form of an execution object" means to translate into the language in which the execution of the program is carried out such as the machine language. As a result, should program data be wrongfully read out from the second memory device, the program would be in an ordinarily incomprehensive language. If the program is made such that reverse compilation cannot be done, the data can be made even more incomprehensible and the know-how in the program can be even more securely protected. However, the user program may be stored in the form before converted into the form of an execution object.

The program made into a library may be a subroutine library. The program-executing means has the functions of executing the subroutine library when there is a dedicated command in the main user program stored in the first memory device for calling the subroutine library and returning to the main user program. This means that the unit can execute the program after it is made into the library. In the above, the "function for returning to the main user program" means returning to the main user program after the specified subroutine program has been executed and continuing it from the command after the dedicated command which had called this subroutine program. By making a subroutine as explained above, it can be used repeatedly as a program part or utilized in creating different programs such that development of programs can be simplified and their productivity can be improved.

The program made into a library may be the whole of the user program. The program-executing means also has the function of setting a program made into a library and stored in the second memory device in an executable condition. In the above, the "function for setting a program in an executable condition" means, if this program has already been compiled, to set a flag such that the compiled program can be executed and, if the program has yet to be compiled, to compile it. After the program has been complied, the complied program may be put in the first memory device. In this manner, the entire user program may be set in a protected condition.

The library-creating means has the function of storing in the second memory device a library name for specifying a program to be made into a library in correlation with this program. It may preferably be provided with library name reading means for reading out a library name stored in the second memory device and storing it in the first memory device. If a library name is thus stored in the second memory device, a program made into a library can be specified and executed by this library name. Such a library name cannot be reached from outside because it is stored in the second library. Thus, unless the programs made into a library are separately managed, it may become impossible to recognize them. The library name reading means is provided for this reason. The library names are written in the first memory device accessible from outside and a tool or the like is used to read out the library names to let the user know what libraries (programs) are stored in the second memory device.

The library-creating means further serves to store in the second memory device library ID data for specifying a library in correlation with a program which has been made into the library and includes backup means for backing up data stored in the second memory device in an external memory device. This backup means serves to determine whether inputted library ID data match preliminarily stored proper data or not and to store the inputted library ID data only if they match. In this manner, only an authorized user who knows the library ID data can back up the data made into a library and stored in the second memory device. Since the library ID data are stored in the second memory device, the unit may be accessed by means of the tool but the data cannot become known and hence unauthorized persons cannot carry out the backup operation.

In the above, the "library ID data" corresponds to what are regularly referred to as the library ID. Examples of the external memory device include memory cards. Such an external memory device may be mounted to a different unit or to the own unit. Memory cards are preferred as an external memory device because they are portable and easily attachable to the unit.

The invention relates not only to single units but also to programmable controllers (PLCs) having the various functions described above, say, by comprising a first memory device that stores a user program, a second memory device, library-creating means for creating a library out of at least a portion of the user program and storing this library in the second memory device, and program-executing means for executing the program made into the library stored in the second memory device, wherein the second memory device is inaccessible by a tool that uploads the user program. The additional functions provided to the units embodying this invention described above may also be provided to programmable controllers according to this invention.

The invention further relates to a method of processing a user program, characterized as comprising the steps of storing the user program in a first memory device of a programmable controller which includes a second memory device not accessible by a tool that uploads the user program, making at least a portion of the user program stored in the first memory device into a library, protecting the program made into the library by storing it in the second memory device, and causing the program made into the library and stored in the second memory device to be executed whenever required while the user program is executed. In the above, "to protect" means to make it such that the tool for uploading the user program is incapable of reading it.

A unit according to this invention may be characterized more specifically in different ways. For example, it may be characterized as being for a PLC including an input circuit for receiving an input signal, program-executing means for executing a user program based on this input signal and an output circuit for outputting results of executing the user program and comprising a first memory storing a user program and a second memory storing a program made into a part library, the user program being created by a tool and having inserted therein a dedicated command for calling and executing the program made into a part library, the program-executing means serving to scan the user program stored in the first memory device, to call and execute the program made into a part library by executing the dedicated command in the user program and to return to and execute the user program after calling the program, the second memory being made inaccessible by the tool such that the program made into a part library is not accessible. In the above, the "input circuit" and the "output circuit" mean devices connected to an inputting external device or an outputting external device or may include an interface for data communication with other devices connected through an interunit bus.

As another example, it may be characterized as being for a PLC including an input circuit for receiving an input signal, program-executing means for executing a user program based on the input signal and an output circuit for outputting results of executing the user program, and comprising a first memory storing a flag by operating a tool and a second memory storing a program made into a total library, the flag causing the program made into a total library to be called and executed, the program-executing means serving to call and execute the program made into a total library stored in the second memory device according to the flag in the first memory, the second memory being made inaccessible by the tool such that the program made into a total library is not accessible.

As still another example, it may be characterized as being for a PLC and comprising a first memory device storing a user program which is created by a tool and has a dedicated command inserted therein for calling and executing a program made into a library, a second memory device storing the program made into a library, and program-executing means for scanning and executing the user program and executing the program made into a library by using the dedicated command from the first memory device to call the program made into a library, and wherein the program made into library is preliminarily stored and is protected by being made inaccessible by the tool used when the user program was created.

As a further example, it may be characterized as comprising a first memory device storing a flag for causing a program made into a library by a tool to be called and executed, a second memory device storing the program made into a library, and program-executing means for reading the flag stored in the first memory in a RUN mode and calling the program made into a library from the second memory device to execute it if the flag is set so as to indicate that the program should be executed, and wherein the program made into library is preliminarily stored in the second memory device and is protected by being made inaccessible by the tool used for setting the flag.

BRIEF DESCRIPTION OF THE DRAWINGS

FIG. 12 is a drawing for explaining the backup/upload functions to a memory card.

FIG. 13 is a drawing for showing an example of data structure stored on a memory card.

DETAILED DESCRIPTION OF THE INVENTION

Figure 1:
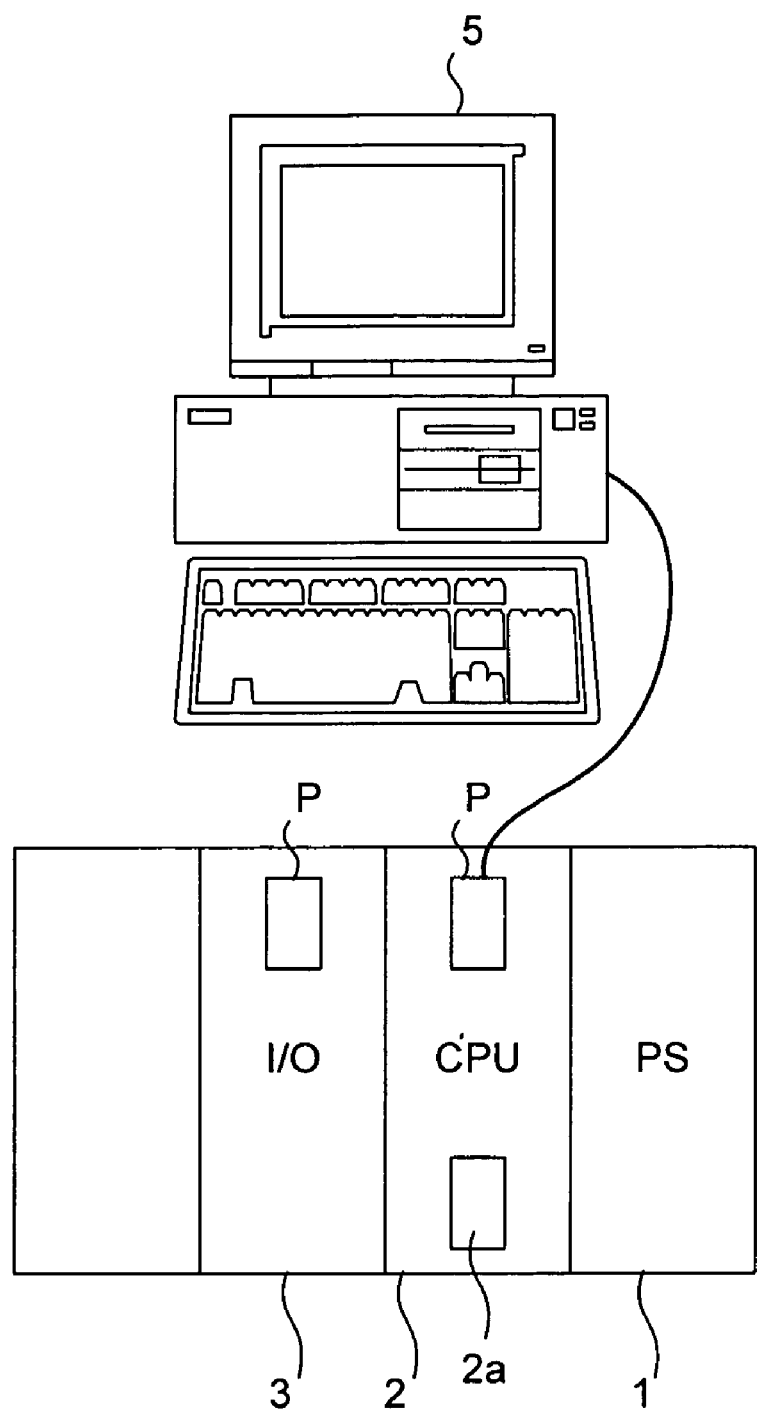
FIG. 1 is a drawing for schematically showing the structure of the entirety of a system embodying this invention.

FIG. 1 shows a system embodying this invention, forming a programmable controller PLC by electrically and mechanically connecting various units such as a power source (PS) unit 1, a CPU unit 2 and an I/O unit 3 by a bus or the like. The CPU unit 2 in this example is provided with a slot 2a such that if a memory card is inserted therein, the data stored in the CPU unit 2 and the I/O unit 3 can be stored and kept on the inserted memory card.

As will be explained below, a microprocessor unit MPU and a user program memory are installed in the CPU unit 2, and the I/O unit 3 is also provided with a processor such as an MPU and a user program memory such that a desired sequence control can be carried out by the CPU unit 2 and the I/O unit 3 with a user program created by a tool stored in these user program memories. For this purpose, the CPU unit 2 and the I/O unit 3 are provided with a port P for communicating with a tool 5 such that a specified user program created by the tool 5 can be downloaded to the user program memories of the ports P of these units.

What is herein referred to as the I/O unit 3 is a unit having the functions not only of downloading a user program created by the user by using a tool (which program may allow changes and editing after being created), storing and holding it inside and carrying it out internally but also of carrying out input/output processing for external devices connected to this unit such as a counter unit, an analog processing unit and a position control unit. The counter unit is a unit used for carrying out calculation processing on pulse signals inputted, say, from an encoder, carrying out a user program by using its results and controlling a servo motor or the like by outputting an output signal based on such a performed program to a servo driver (which may be outside or contained inside the unit). The output signal to the servo motor may be an analog signal for controlling the speed of a motor or a pulse signal for controlling a pulse motor. The inputted signal need not be a pulse signal but may be an analog signal, say, from a displacement sensor. The analog processing unit is for inputting an analog signal from a pressure sensor or a displacement sensor, converting it into a digital signal, carrying out a user program on the basis of such converted signals and outputting the result of this processing as an analog signal. Such units as the counter unit, the analog processing unit and the position control unit that carry out a specified function are sometimes referred to as a high-function unit or a special-function unit. The present invention is applicable to such high-function and special-function units.

Figure 2:
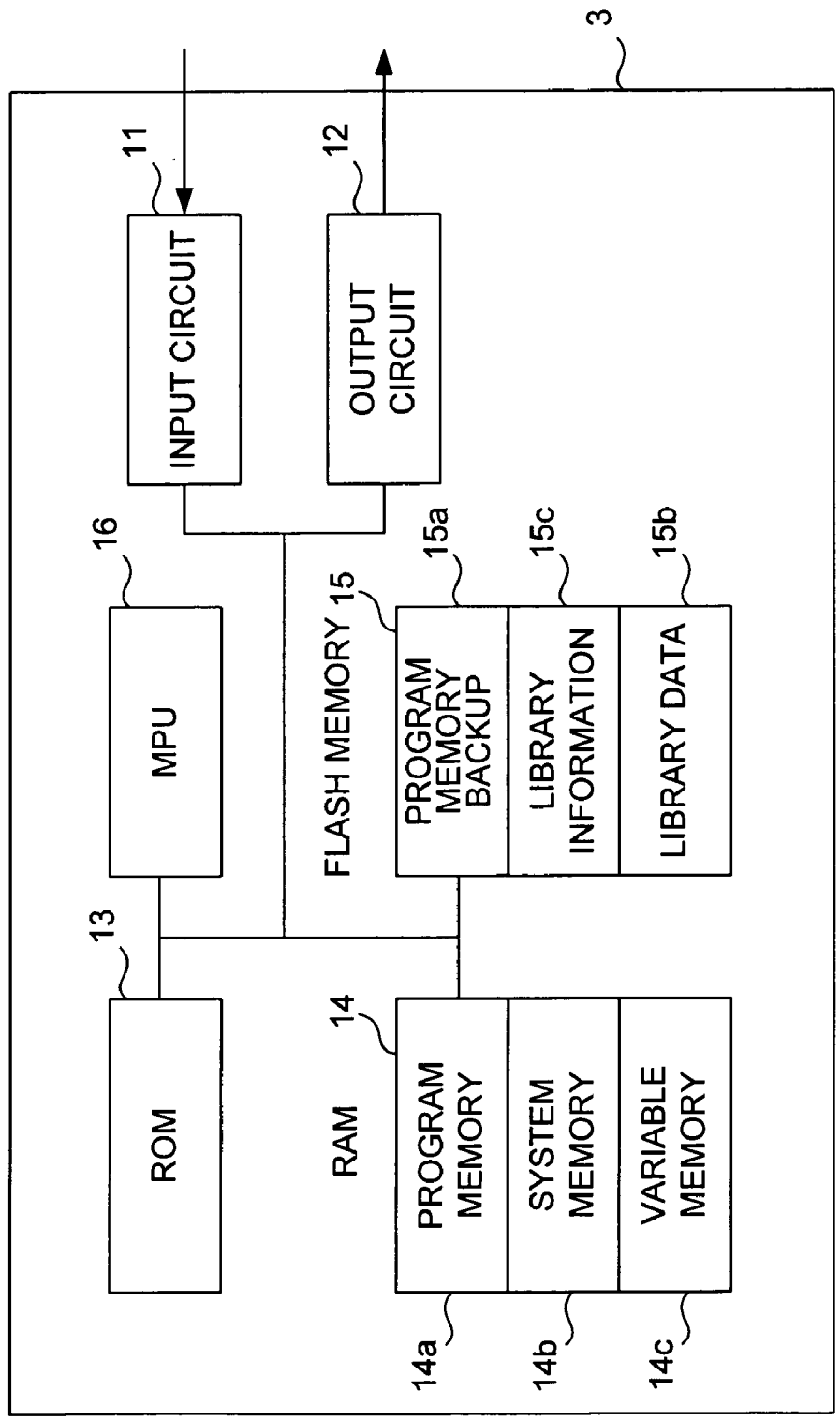
FIG. 2 is a block diagram showing the internal structure of the I/O unit.

The I/O unit 3 is internally structured as shown in FIG. 2, comprising an input circuit 11 for inputting signals from devices such as sensors and an output circuit 12 for outputting specified control signals. In other words, the I/O unit 3 carries out transfer of I/O data by inputting input signals from external devices (not shown) connected to the input circuit 11 and outputting output signals to external devices (not shown) connected to the output circuit 12. The I/O unit 3 further comprises a ROM 13, a RAM 14 and a flash memory 15 as memory means as well as an MPU 16 serving to carry out programs stored in these memory means and controlling the operations of the I/O units 3 itself. These memory means and the MPU 16 are connected together through bus lines inside the I/O unit 3.

The ROM 13 stores a system program, which means program data regarding the system control processing to be carried out within the I/O unit and includes the details of processes of individual commands in the user program and the details of the controls necessary to make libraries (to be explained below). The RAM 14 is provided with a PRG memory area 14a for storing the user program during its execution, a system memory area 14b for setting system conditions for the I/O unit and a variable memory area (or work area) 14c for storing input signals received from the input circuit 11 and output signals to be transmitted to the output circuit 12 as results of execution of the program, or the I/O data. The flash memory 15 is provided with a PRG backup area 15a for storing the user program for the time of power shut-down, a library data storage area 15b for storing data made into libraries, and a library information memory area 15c for storing data for reading out stored library data.

The MPU 16 serves to communicate with external devices connected to the I/O unit 3 and to appropriately carry out the user program put on the RAM 14 according to the inputted signals. This user program is either the one found in the PRG memory 14a of the RAM 14 or the program put on the PRG memory 14a of the RAM 14 from the library information memory area 15c of the flash memory 15, as will be explained in detail below. Each command of the user program is carried out by the MPU 16 by referencing the system program stored in the ROM 13. The results of execution are transmitted as output signals to the external device connected to the I/O unit 3. The I/O unit 3 is adapted to repeatedly carry out the inputting process, the execution of the user program and the outputting process in a cyclic fashion. A peripheral processing cyclic period may be provided after the outputting process such that there are four processes to be carried out cyclically.

Examples of peripheral processing include processing in response to a request from a tool, processing in response to a request received through communication unit of the PLC and remote I/O communications. Input and output processing need not be separated but may be treated as a series of processing. A pre-processing period may be introduced at the beginning of a cyclic processing such that four processes consisting of the pre-processing, the user program execution processing, the input/output processing and the peripheral processing may be repeatedly carried out. The pre-processing may include the process of checking the presence of an abnormal condition in the unit itself. The pre-processing may be regarded as including a state-dependent processing such as the process of checking the conditions of flags ("create-library flag" and "read-library flag" to be described below) and the mode setting (that is, whether in the program mode or in the RUN mode). The state-dependent processing in the pre-processing depends on the flag conditions or the mode condition. If the aforementioned flags are not up while the unit is in the RUN mode, the user program is executed. If each flag is up or the unit is in the program mode, the user program is not carried out and the processing corresponding to the flag ("flag execution process") or the programming mode is carried out. Although the flow of processing moves on different branches in this state-dependent processing, the branching comes to an end thereafter at the time of peripheral processing and the program returns to the pre-processing. In summary, the aforementioned four processes are repeatedly carried out. The special relay service processing (explained below) is carried out as a part of the state-dependent processing or the flag execution process in the cyclic processing.

The MPU 16 also functions so as to transmit and receive data to and from the CPU unit through the buses not in synchronism with this cyclic processing. This is the process of receiving a request from the CPU unit to read out I/O data and returning the corresponding I/O data (transmission-reception processing).

According to this invention, the user program (created in a multi-purpose language such as the ladder language) stored in the RAM 14 is made into a library either in part or in its entirety and stored in the flash memory 15 (according to the present example) as a memory area not accessible from the tool. Such an area "not accessible from the tool" is created by not providing any read command from the tool regarding the flash memory 15 of the I/O unit 3. Another method is to prepare the I/O unit 3 such that a read command from the tool will not be thereby processed. It is sufficient in any manner if the flash memory 15 of the I/O unit 3 is made inaccessible and no data can be read out thereof.

In this way, the tool can read out data stored in the RAM 14 in response to a read command but cannot read out any data stored in the flash memory 15. Thus, program data containing the user's know-how can be reliably protected by making a library out of the portion containing the know-how and storing it only in the flash memory 15 (and further erasing the program data containing the know-how or taking care such that such program data will not remain). The protection can be made even safer if the storage into the flash memory 15 is made not in the ladder language by the user but in a state of execution object. In this manner, even if a competitor analyzed the flash memory to read out its contents, it is in a normally incomprehensible language and a reverse compilation is usually not possible. Since the flash memory 15 cannot be read or referenced from the tool 5, as explained above, there is sufficient protection even if the user program is stored in a recoverable form including recovery to the state of ladder diagram or the mnemonic form.

In the above and hereinafter, expression "user" is intended to include not only intermediate users but sometimes also makers of the PLC as well as the end users. In other words, this expression may include even legitimate users capable of developing user programs, downloading such user programs and making them into a library.

For the purpose of the above, the MPU 16 is provided with a library-creating function (to be explained below with reference to FIGS. 3 and 4) for making a library out of a user program stored in the RAM and storing it in the flash memory 15. Either a "part library" or a "total library" may be created by the library-creating function.

There are different kinds of part libraries. As one example, a part library may be created from a part of a user program made of a main program. In this case, the program which is made into a part library becomes a subroutine program. In other words, the main program includes a subroutine and the subroutine program is converted such that it can be treated as a part library. After made into the form of a part library, the subroutine program is carried out by using a dedicated command at the time of the execution of the main program to call the subroutine now in the form of a part library.

Another example is where the entirety of a user program made entirely of a subroutine is made into a part library. In this case, each of one or more subroutines becomes a subroutine program as a part library. The subroutine program, after being made into a part library, is executed by using a dedicated command to call this subroutine at the time of executing a main program to be separately created later.

As explained above by way of two examples, what is made into the form of a library as an object program to be called from a main library and executed is herein referred to as a part library. According to this invention, dedicated commands (to be explained below) are provided for calling specified part libraries from the main library.

Part libraries are useful. If a part of a program frequently used by the user is made into a subroutine as a part library and a dedicated command is inserted in the user program at necessary places for calling and executing this part library within a separately created user program (main program), a program can be formed easily and efficiently. In other words, once a part library is formed, it can be used as a kind of command when a main program is thereafter created. Since a subroutine thus made in the form a part library is separate from the main program, it is not affected when the main program is created or edited. If the unit provider makes only the core processing parts of an application program in the form a part library and offers the unit in this operating format to the user, the user can freely create a main program by using the programs of this part library and easily customize a program suitable for the system.

Next, the total library will be explained. When it is desired to make a library out of the entirety of an ordinary user program (other than those special user programs made only of subroutine programs), the entirety of such a user program becomes the object of a total library and this is treated as one library, and this user program is entirely made into one total library. When such a total library is used, it is carried out as one block of main program. A total library is so named because it is thus treated like one main program. A total library may be made use of when it is desired to protect a control program of a user in its entirety or when a unit provider wishes to present to a user a unit with the entirety of an application program for a specified purpose preinstalled in the form of "an XXX control unit for a specified purpose."

Figure 3:
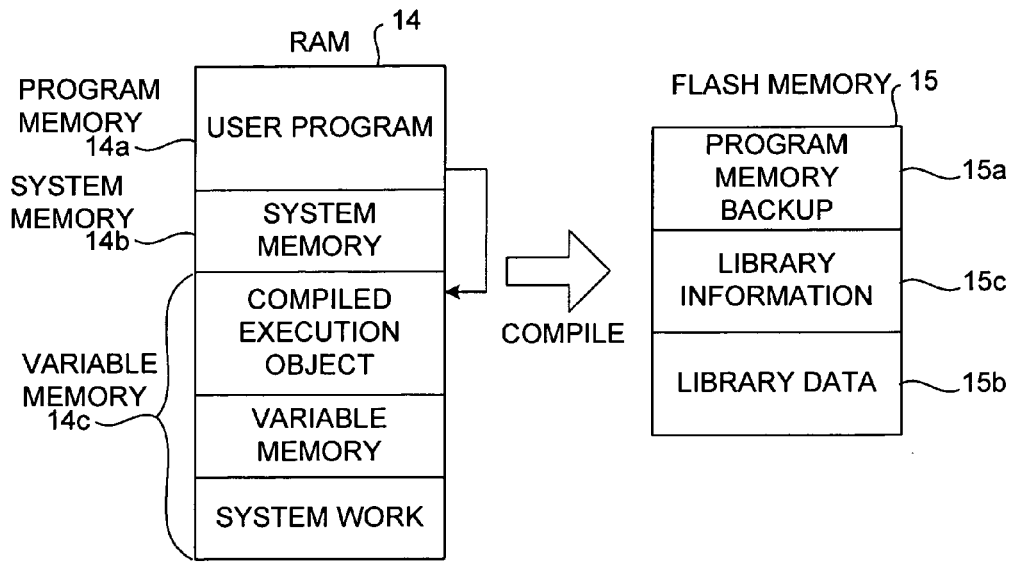
FIG. 3 is a diagram showing the data structure of the RAM and the flash memory.

Next, the library-creating function is explained. FIG. 3 shows the relationship between the RAM 14 and the flash memory 15 regarding the library-creating function. The PRG memory area 14a of the RAM 14 is for storing a user program created by the tool after it is converted into an intermediate code (or intermediate language). A flag indicating whether the program stored in the intermediate language is a program to be made into a library or not is set from the tool in the variable memory area of the variable memory 14c of the RAM 14. Various system setting data for making a library such as the library type (whether a total library or a part library) are stored in the system memory area 14b from the tool. This setting is carried out by the I/O unit 3 in the programming mode.

The I/O unit is thereafter switched into the RUN mode. It is for the purpose of compiling the user program stored in the PRG memory area 14a of the RAM 14. Data of the execution object created by running the user program (the user program translated into the machine language) are stored in the execution object area of the variable memory 14c of the RAM 14. Data which are necessary for program execution such as the subroutine table created at the same time as the user program is compiled and also stored in the system memory area 14b.

When the I/O unit is switched to the RUN mode, the MPU 16 functions such that the user program in the PRG memory area 14a is stored in the PRG memory backup area 15a of the flash memory 15. This is for the purpose of recovering the user program in the PRG memory of the RAM 14 whenever necessary. This may happen, for example, while a program being created is edited and downloaded to the unit and the mode is being switched to the RUN mode when the user program, while being edited, is erased from the RAM 14 or becomes unstable because the power source has been turned off. A backup program is stored such that the user, even in such a situation, can recover the previously downloaded program.

After the library-creating process is finished, the content of this backup area of the flash memory is erased and put again in the RAM 14 so as to be inaccessible from the tool. Instead of erasing the content, the program may be updated to another program which need not be protected (such as a program consisting only of an END command).

Explained more in detail, the content of the RAM 14 is completely erased if the power source to the unit is switched off. Thus, even if the user program is once stored in the RAM 14, the user program containing parts to be protected is erased if the power source to the unit is switched off after the library-creating process is finished and the program to be kept secret cannot be read out even if an attempt is made from the tool to access the RAM 14. The stored content of the flash memory 15 is not erased even if the power source of the unit is switched off.

The variable memory area 14c of the RAM 14 stores a flag related to the execution of library creation (the create-library flag) to be explained below with reference to FIG. 4. This flag is set after the user creates a user program by means of the tool when it is desired to make it into a library.

Figure 4:
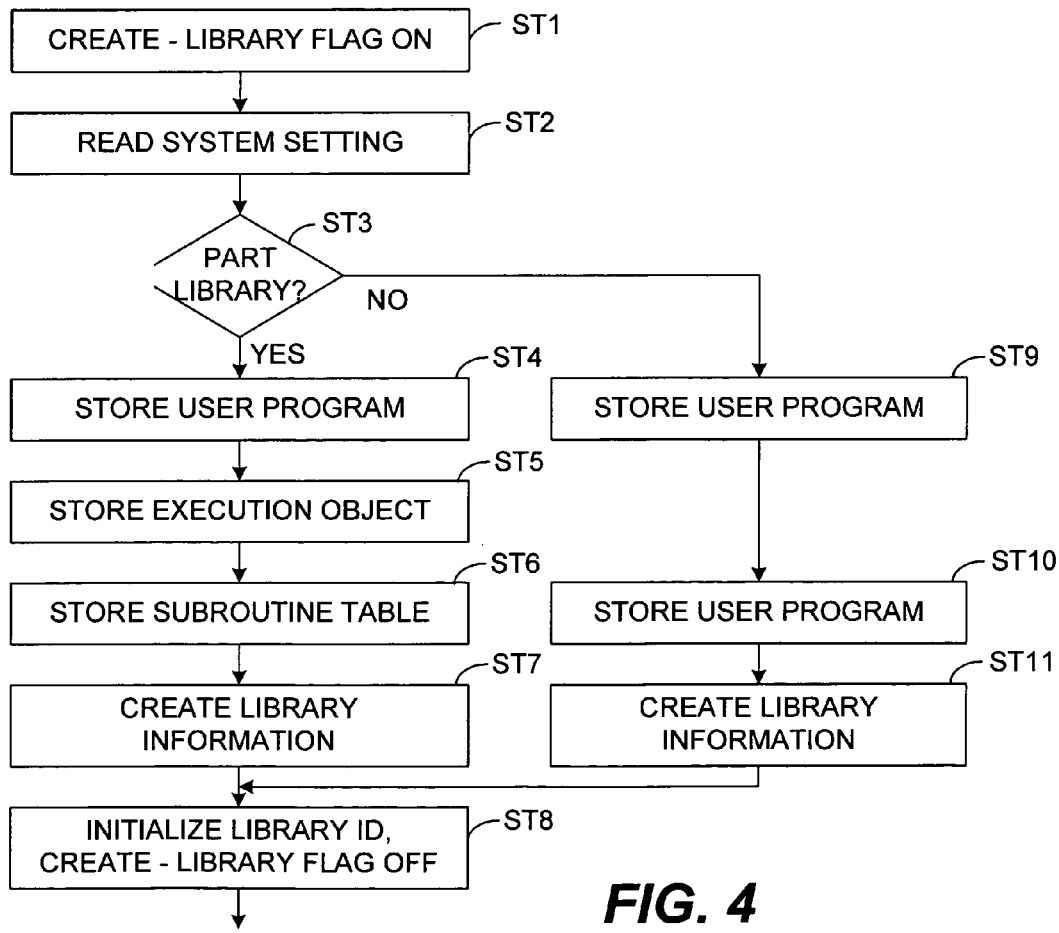
FIG. 4 is a flowchart of the library-creating function.

Under this condition, the MPU 16 may carry out the library-creating function according to the flowchart shown in FIG. 4. As the mode of the I/O unit 3 is changed from the RUN mode back to the programming mode, the MPU 16 checks the create-library flag in the variable memory area 14c of the RAM 14 regarding the user program created by the tool. If the flag is ON (Step ST1), the MPU 16 reads out the various system settings stored in the system memory area 14b of the RAM 14 (Step ST2) and determines from the contents of the system settings thus read out whether the library is a part library or a total library (Step ST3).

The program to be made into a part library is created by the tool but there are two ways to make a library out of it after it is created. One of the methods is to use the tool to specify the object program and then to download only the object portion to the I/O unit. In this case, the object to be made into a library becomes the whole of a user program made of subroutine programs stored in the RAM when a part library is created. The other method is to first download the entire user program created by the tool (inclusive of the portion to be made into a library) into the I/O unit and then to specify the object portion to be made into the library. In this case, only a portion that is stored in the RAM 14 is made into a part library.

If a part library is specified (YES in Step ST3) or if a portion or the entirety of the user program is made into a part library, the MPU 16 serves not only to read out the target user program stored in the PRG memory area 14a of the RAM 14 but also to store the program thus read out in the library data memory area 15b of the flash memory 15 in the intermediate language (Step ST4). This step is carried out for storing on the flash memory 15 the user program in the way it was before it is made into an execution object. Since this content can be reverse-compiled, it may be recovered in the condition of a ladder diagram, if necessary, or seen in a mnemonic form.

Next, the MPU 16 reads out the execution object of this user program stored in the execution object area of the variable memory area 14c of the RAM 14 and stores this execution object (the user program translated into the machine language) in the library data memory area 15b of the flash memory 15 (Step ST5). This may be done by switching the I/O unit 3 into the RUN mode and preliminarily storing an execution object created by running the user program in the execution object area of the variable memory area 14c of the RAM 14 but this is not necessary. The user program of the RAM 14 may be compiled and the compiled execution object may be stored in the library data memory area 15b of the flash memory 15. Since the stored content is in a normally incomprehensible language and reverse-compilation cannot be done, it cannot be recovered to the condition of the ladder diagram or to the mnemonic form. Although an example is shown wherein the user program is doubly stored in the library data memory area 15b in Steps ST4 and ST5, that is, although both the user program before made into an execution object and the user program after made into an execution object are stored in the library data memory area 15b, either Step ST4 or ST5 may be omitted.

Next, the MPU 16 reads out from the system memory area 14b of the RAM 14 necessary information for the execution of the program such as the subroutine table created when the object user program was compiled and stores them in the library information memory area 15c of the flash memory 15 (Step ST6). The subroutine table contains subroutines, numbers individually assigned to them and correlation data such as the address ranges of the flash memory containing them. Moreover, other library information is generated and stored in the library information memory area 15c of the flash memory 15 (Step ST7). The library information may include library IDs which are codes for recognizing libraries, own names assigned to the libraries (library names) and reference information table (or library command table) when special commands are being used within the library. The library information is used, for example, when a proper user makes a backup copy on a memory card or downloads something from a memory card. The library IDs and the library names are generated by reading out what the user has preliminarily set by using a tool and stored in the system memory area 14b of the RAM 14 at the time of the library-creating operation. The library command table is created in the unit system processing carried out at the time of the library-creating processing. In addition to the aforementioned preliminarily stored and set data, other data for reading out a user program such as the address and pointer inside the library data memory area storing the user programs and execution objects are also stored as library data.

Figure 5:
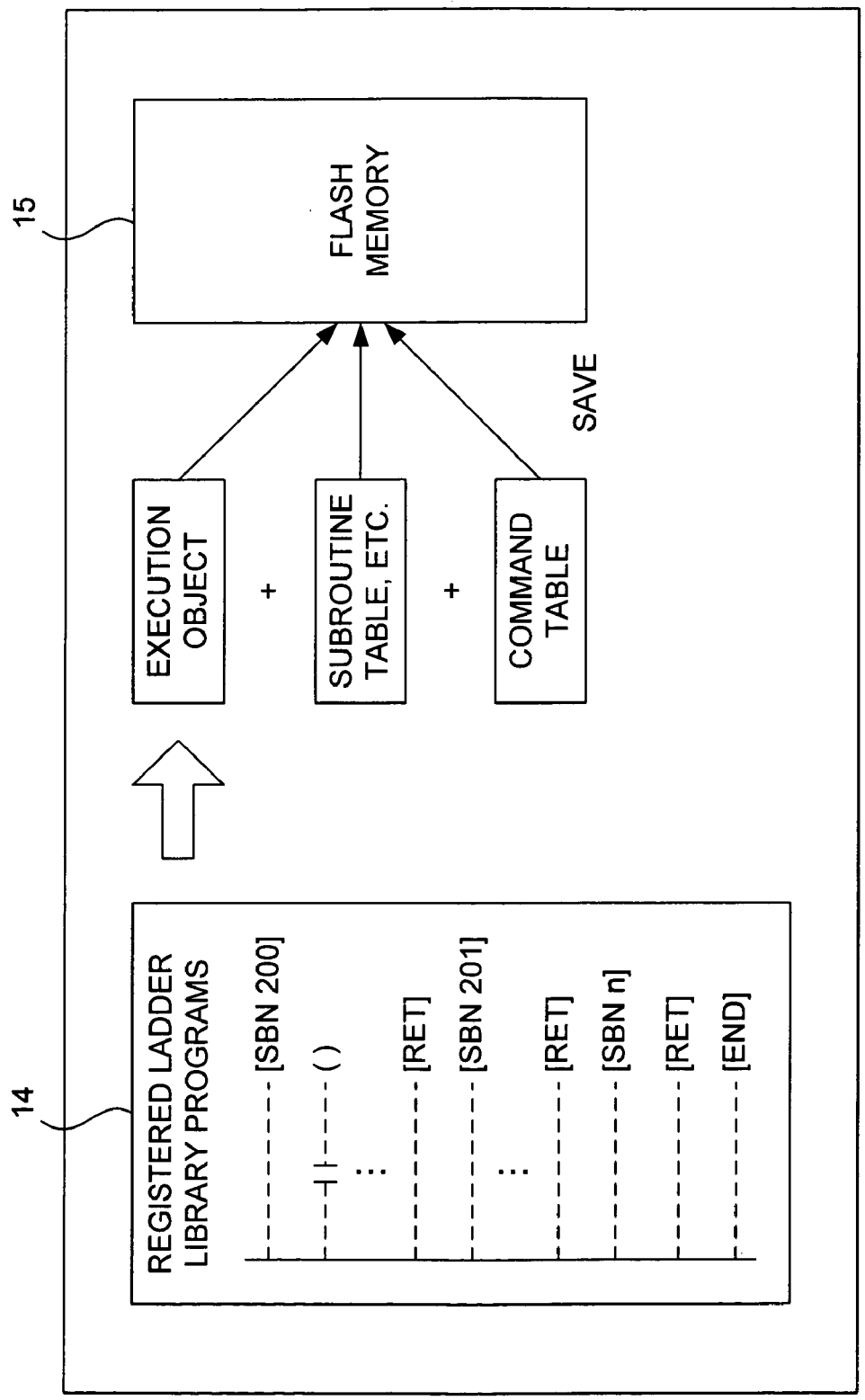
FIG. 5 is a conceptual diagram of an example of process wherein a user program in the RAM is made into a part library and stored in the flash memory.

Since the library ID remains thereafter in the accessible RAM 14, the library ID is initialized so as not to be used by anybody other than the authorized user, the create-library flag is switched off and the entire library-creating process is finished (Step ST8). Although it was explained above that the library ID is erased, library information other than the library ID may be similarly erased by initialization. FIG. 5 shows schematically by an example the concept of the process wherein a user program stored in the RAM 14 is made into a library (a part library) and stored in the flash memory 15.

Figure 6:
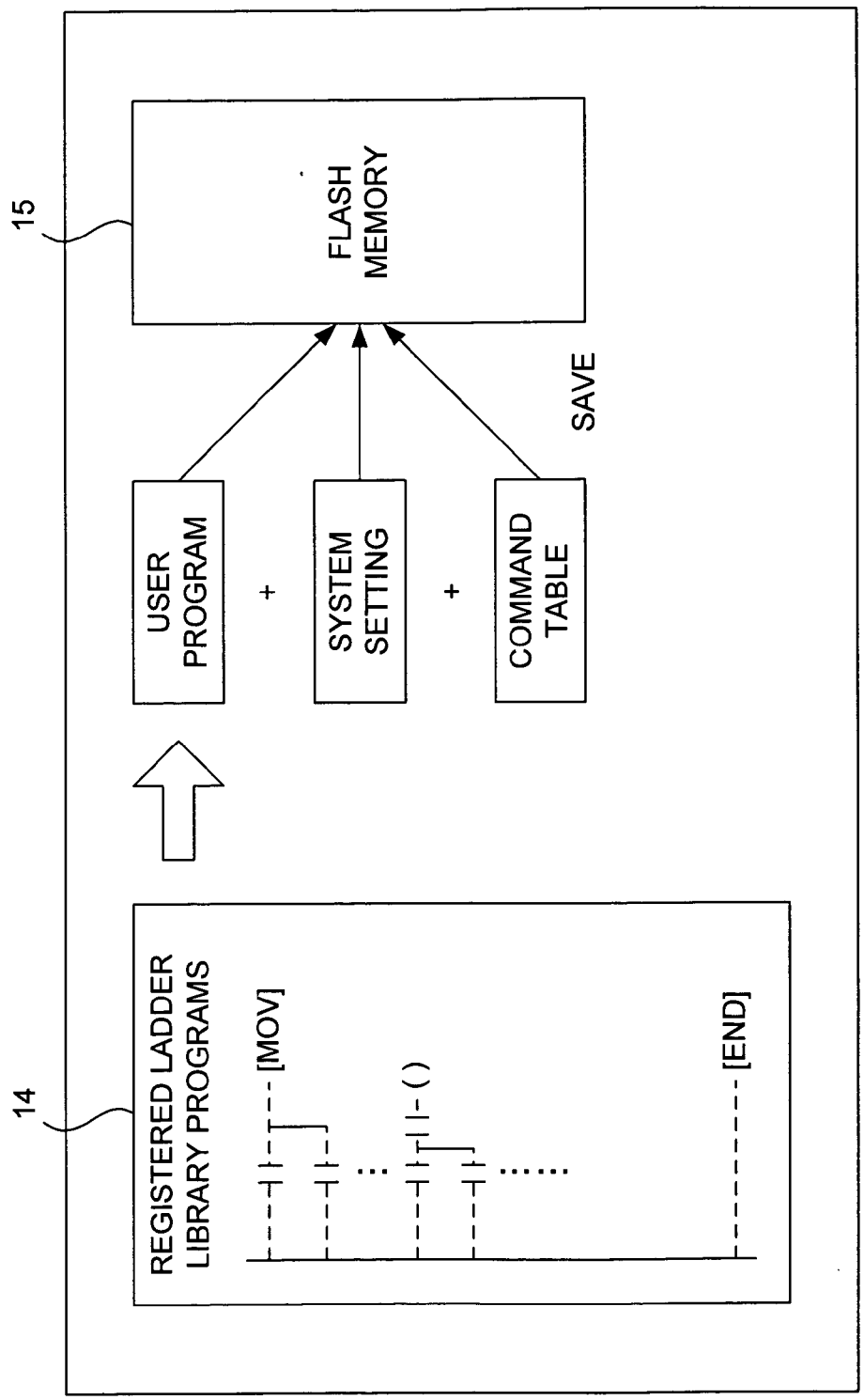
FIG. 6 is a conceptual diagram of an example of process wherein a user program in the RAM is made into a total library and stored in the flash memory.

If a total library (instead of a part library) is specified in Step ST3 (or NO in Step ST3), the MPU 16 reads out the user program stored in the PRG memory area 14a of the RAM 14 and stores the user program thus read out in the library data memory area 15b of the flash memory 15 (Step ST9). Next, the MPU 16 reads out the various system settings stored in the system memory area 14b of the RAM 14 and stores them in the library information memory area 15c of the flash memory 15 (Step ST10). The MPU 16 further creates other library information and stores it in the library information memory area 15c of the flash memory 15 (Step ST11). The library information may include library IDs which are codes for recognizing libraries, own names assigned to the libraries (library names) and reference data table (or library command table) when special commands are being used within the library. The process for creating these library data is basically the same for that in the case of a part library. Thereafter, the library-creation execution flag is switched to the OFF condition and the entire library-creating process is finished (Step ST8). FIG. 6 shows schematically by an example the concept of the process wherein a user program stored in the RAM 14 is entirely made into a library (a total library) and stored in the flash memory 15. The library programs thus made into the form of a library and stored in the flash memory 15 (in Steps ST4, 5 add 9) are executed in an execution environment to be explained with reference to FIGS. 8, 9 and 10.

Finally, the stored contents of the RAM 14 and the PRG memory backup area of the flash memory 15 are erased but this may be carried out in various ways. As one example, the user uses the tool after Step ST8 to create a user program containing only an END command and downloads it to the I/O unit 3. As a result, the user program containing only an END command is stored in the PGM memory 14a of the RAM 14. At this moment, the previous user program created at the time of making a library is written over and erased such that only the new user program having only the END command remains. As the I/O unit 3 is switched to the RUN mode, the user program with only the END command is also stored as a backup in the PRG memory backup area 15a of the flash memory 15, thereby erasing the earlier stored program. If the power source of the I/O unit 3 is thereby switched off, the stored contents of the RAM 14 are erased. Thus, the program to be made into a library is erased from the accessible (readable) memory area.

According to another example, as the entire library-creating process is finished in Step ST8, the user program to be made into a library, remaining in the PRG memory 14a of the RAM 14 and the PRG memory backup area 15a of the flash memory 15 is erased by a system operation of the I/O unit. According to still another example, the tool is operated to carry out an erasing operation either before or after Step ST8.

Next will be described the execution of a program made into the form of a library to carry out a control by using the I/O unit 3 with a user library made into the form of a library by activating the library-creating function of the MPU 16.

First, a user (say, another user different from the person who created the library) creates a user program by using a tool. If a part library is stored in the flash memory 15 at this moment and it is desired to make use of this part library, dedicated commands such as "LIB", "A", "B" and "C" for calling subroutines are written in the main program (created in the ladder language), "LIB" being the command for calling the part library (subroutine library) stored in the flash memory 15, "A" being the library subroutine number for specifying a library subroutine in the flash memory 15, "B" being the input CH starting number for specifying the beginning of the area of the data to be inputted to the library, and "C" being the output CH starting number for specifying the beginning of an area for storing the data of the result of execution of the library. The subroutine number of "A" can be known, if the user who created the library explains the contents of processing of the subroutine programs and their subroutine numbers in the operation manual of the I/O unit or the like, by referencing such explanations. Areas "A" and "B" may be set by the user who created the library in a data memory (not shown in FIG. 2) within the I/O unit 3. After the user program is created, it is downloaded from the tool to the I/O unit 3 though a port. After downloaded, the user program is stored in the RAM 14. As the I/O unit 3 is switched to the RUN mode, the user program stored in the RAM 14 is not only stored in the PRG backup area of the flash memory as a backup but also compiled and stored as an execution object in the execution object storing means of the RAM 14. The initialization process in the RUN mode will be described below in detail with reference to FIG. 10.

Figure 7:
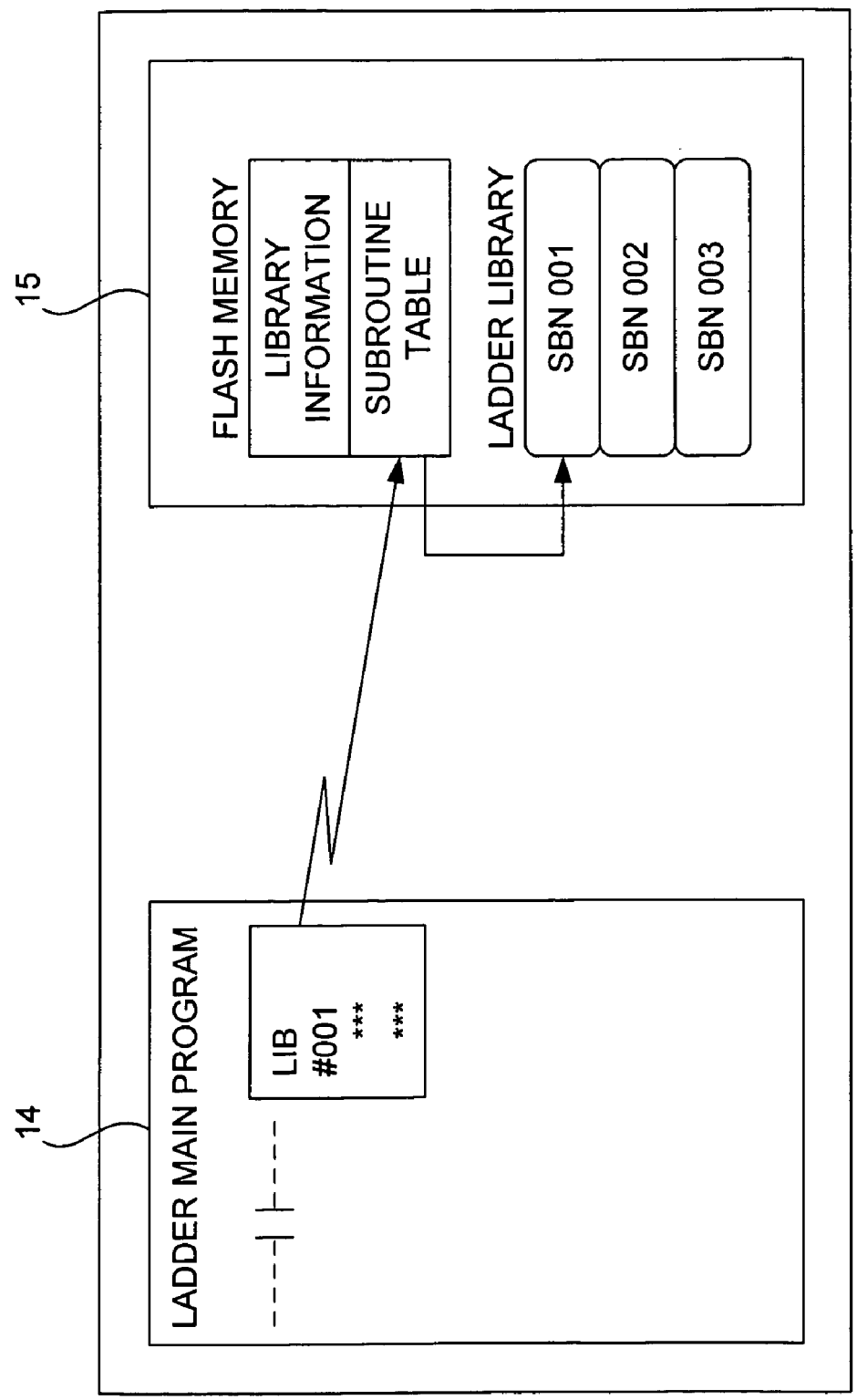
FIG. 7 is a conceptual diagram of the execution of a subroutine program in a main program.

The I/O unit 3 in the RUN mode carries out the main program stored in the execution object area of the variable memory of the RAM 14 by the MPU 16. If there is a dedicated command during the execution, the MPU 16 recognizes the library subroutine number of its subroutine program and references the subroutine table in the library data stored in the library data memory area 15a of the flash memory 15 on the basis of this subroutine number. The storage position of the corresponding part library in the flash memory is recognized by the MPU 16 and this part library is activated. At this moment, the program counter switches from the address of the user program (main program) on the PGM memory of the RAM 14 to a specified address in the library data area of the flash memory 15 storing the part library. When the part library is activated, necessary data such as the return address are stacked in a subroutine work table for the library. When the operation returns from a subroutine inside the library to the execution of the main program, the stacked return address is entered into the program counter and the prosecution of the main program is continued. FIG. 7 shows schematically the concept of the execution of a subroutine program in a main program. "LIB #001 * *" in the ladder main program in FIG. 7 corresponds to aforementioned "LIB", "A", "B" and "C".

Figure 8:
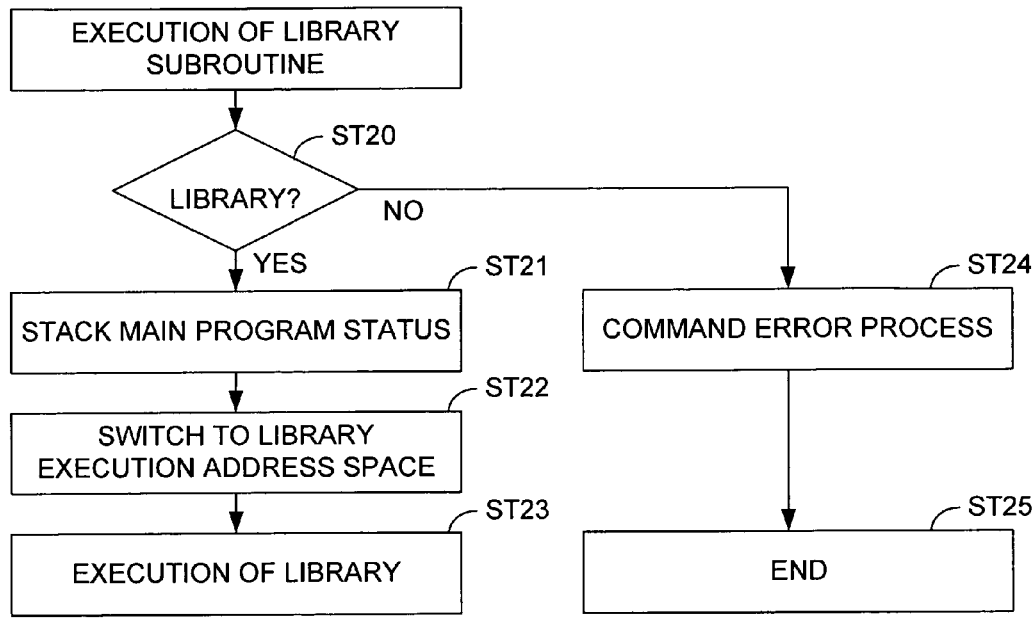
FIG. 8 is a flowchart for explaining the function of reading out a part library.
Figure 9:
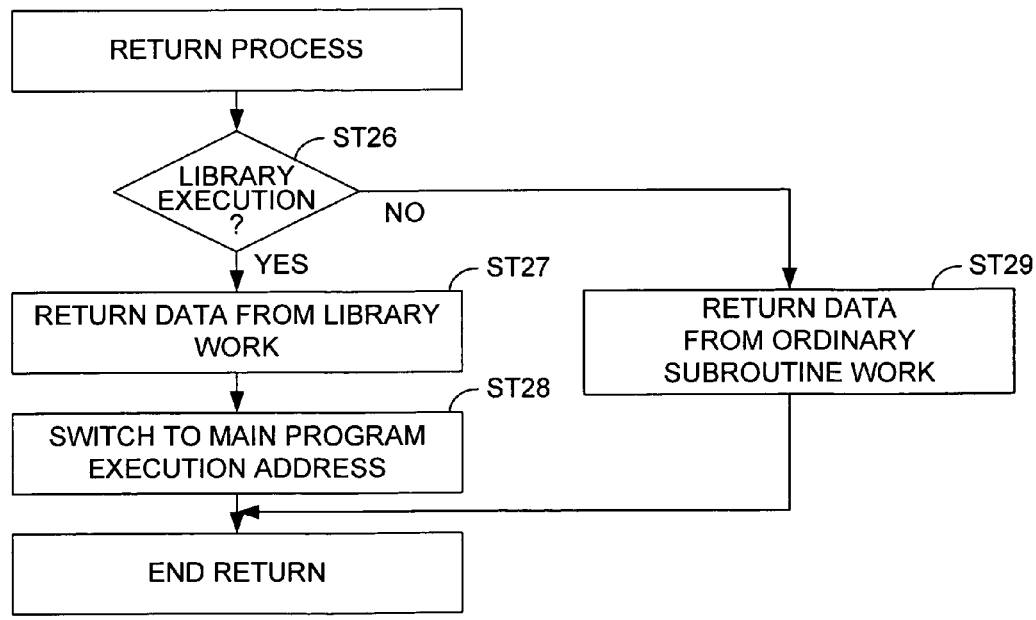
FIG. 9 is a flowchart for explaining the function of reading out a part library with return function.
Figure 10:
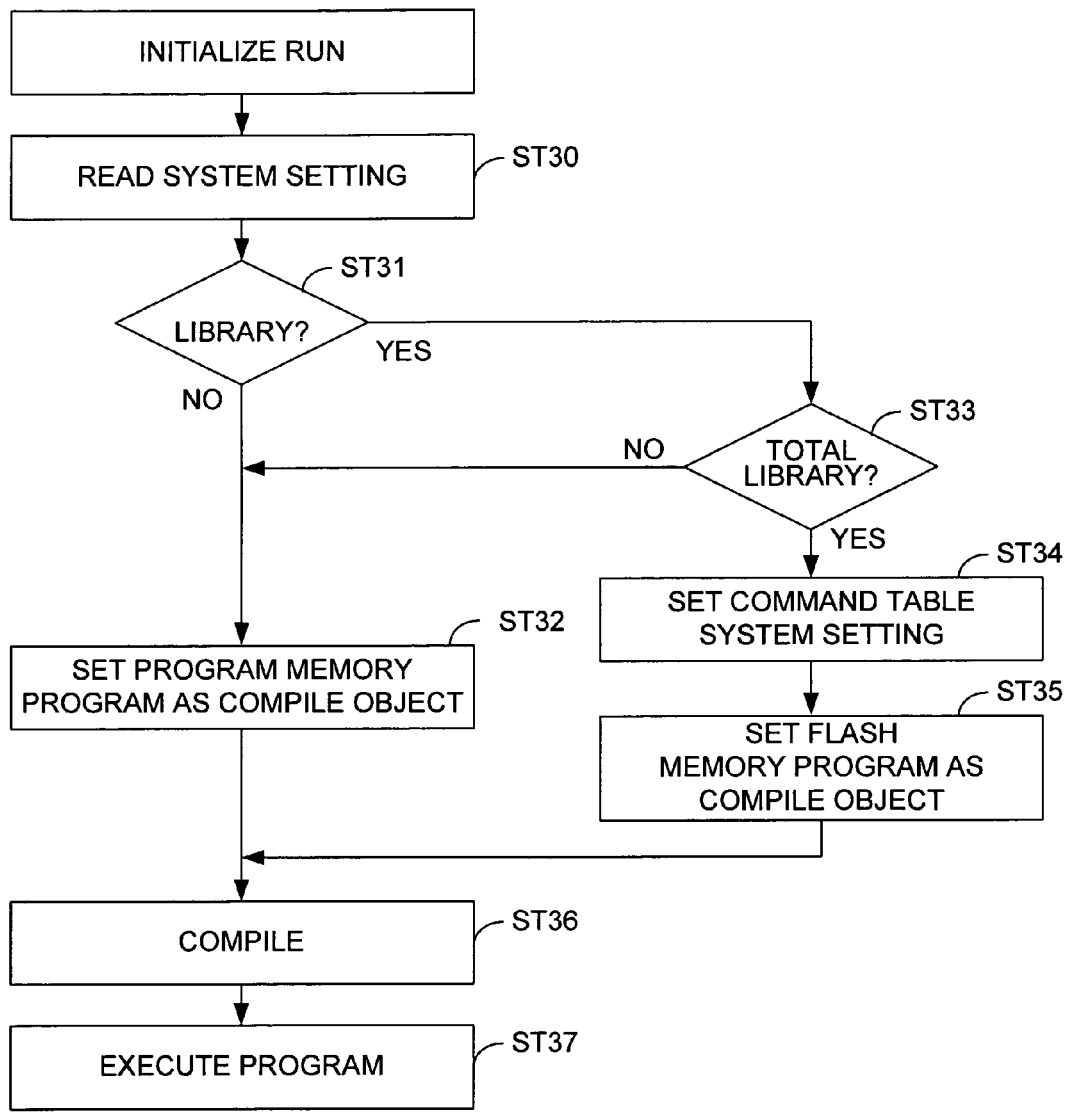
FIG. 10 is a flowchart for explaining the function of carrying out a total library.

The processing explained above is explained more in detail with reference to the flowcharts of FIGS. 8 and 9. Suppose now that the MPU 16 is executing a main program. If dedicated command "LIB" appears during this execution, the MPU 16 serves to activate the library subroutine execution processing shown in FIG. 8, starting the program by checking whether or not there is a specified library (Step ST20). If there is a specified library (YES in Step ST20), main program execution status (such as execution address) is stacked in the library execution work for saving information necessary for returning to the main program after the subroutine has been executed (Step ST21).

Next, the MPU 16 switches the program counter PC from the main program execution address space to the library execution address space (Step ST22) and executes the program made into the form of a library (Step ST23). In other words, the specified library is read out from the flash memory according to the library information and the program is executed. If there is no specified library (NO in Step ST20), a command error process is carried out (Step ST24) and the process is concluded (Step ST25).

FIG. 9 shows a flowchart for the processing by the MPU 16 when Step ST23 has been completed and the routine goes back to the main program. This returning routine according to the present embodiment of the invention is in common with the return routine from ordinary subroutines that are programs created as a part of a ladder main program stored in the RAM 14 and are not a subroutine made into a library and stored in the flash memory. For this reason, it is first determined whether or not the present execution of the subroutine is an execution of a library (Step ST26). If the present execution is an execution of a library (YES in Step ST26), the return is made from the main program execution status (such as execution address) of the stacked library work (Step ST27) and the data that were stacked (the main program execution status) in Step ST21. On the basis of the data thus obtained, the program counter is switched to the main program execution address (Step ST28) such that the return process is completed and the main program is sequentially carried out. If the return is from an ordinary subroutine (NO in Step ST26), data that were stacked before the execution of the subroutine are obtained from the ordinary subroutine work (Step ST29) and the return routine is completed.

A total library is executed by executing the program made into the form of a library as a main program. This execution method is different from that of executing a part library in an ordinary user program as explained above. An ordinary user program is executed by reading out the user program as a main program from the PRG memory area 14a of the RAM 14 and compiling it. When a total library is executed, however, since the user program to be read out is not stored in the RAM 14 but as a library in the flash memory 15, this program stored in the flash memory 15 is treated as the object of compilation and the program is executed after it is compiled.

The I/O unit 3 according to an embodiment of this invention can handle ordinary user programs as well as user programs in the form of a part library or a total library. For this reason, a RUN initialization process is carried out after activation, as will be explained in detail with reference to FIG. 10.

When a user (different from the user who created the library) creates a user program by using a tool and executes it by downloading it into the PGR memory area 14a of the RAM 14 of the I/O unit 3, if a part library is called in the created user program to be made use of, specified information of the library of the system memory area 14b of the RAM 14 is set in the part library. If the library is not used but only an ordinary user program or an ordinary subroutine is processed, specified information of the library in the system memory area 14b of the RAM 14 is set in an ordinary user program execution which is neither a part library nor a total library.

Thereafter, the I/O unit 3 is switched from the program mode to the RUN mode. As it is switched to the RUN mode, as explained above, the MPU 16 stores in the backup area 15a of the flash memory 15 as a backup the user program which has been downloaded in the PGR memory area 14a of the RAM 14. If a user program is stored in the backup area 15a of the flash memory 15 and the PGR memory area 14a of the RAM 14 is empty at the time of power-on, for example, the MPU 16 serves to develop the user program of the backup area 15a of the flash memory 15 in the PGR memory area 14a of the RAM 14.

When the mode is switched to the RUN mode, the MPU 16 reads out the system setting stored in the system memory area 14b of the RAM 14 (Step ST30) and determines whether there is a specified library (Step ST31). If there is no specified library (NO in Step ST31), there is only an ordinary user program to be executed and the user program stored in the PGR memory area 14a of the RAM 14 is set as an object of compilation (Step ST32).

If there is a specified library (YES in Step ST31) but if it is a part library (NO in Step ST33), the program returns to Step S32 because the main program is executed from the user program stored in the RAM 14. In this case, however, the part library program is not executed because it is already compiled in Step ST5 of FIG. 4 and stored in the flash memory 15 in the form of an execution object. If Step ST5 was not done and only Step ST4 has been carried out, the user program before made into an execution object stored in the flash memory 15 in Step ST4 is read out, compiled and stored in the flash memory as an execution object (not shown in FIG. 10).

If the specified library is a total library (YES in Step ST33), the command table system setting stored in the library information memory area 15c of the flash memory 15 is set (Step ST34). Thus, it becomes known where inside the flash memory the total library to be compiled is stored. The program (the total library) stored in the library data memory area 15b of the flash memory 15 is set as the object of compilation (Step ST35).

After Step ST32 or ST35 has been executed, the MPU 16 reads out and compiles the object library program stored in the library data memory area 15b of the flash memory 15 (Step ST36) and stores it in the RAM 14 in the form of an execution object. Thereafter, the user program is executed in an ordinary RUN mode. It is to be noted that Steps ST34, ST35 and ST36 are functions for the execution of a total library and hence that an I/O unit corresponding to only total libraries need not be provided with Steps ST30 through ST33.

Part and total libraries are thus created and executed. In the case of a part library, the program to be made into the form of a library is once stored in the RAM 14, as explained with reference to FIG. 3. After it is made into a library, the program is erased from the RAM 14 since it is no longer needed. Since the substantial user program now consists of the main program stored in the RAM 14 and the part library stored in the flash memory 15, the area of the RAM 14 corresponding to the portion of the program made into the form of a library can be saved. In other words, the usable area in the RAM 14 is accordingly increased. If the ratio between the portion of the program to be made into a library and the portion to be stored in the RAM 14 is appropriated adjusted, it is possible to create a user program with a size substantially greater than the memory capacity of the PGR memory area 14*a* of the RAM 14.

Figure 11:
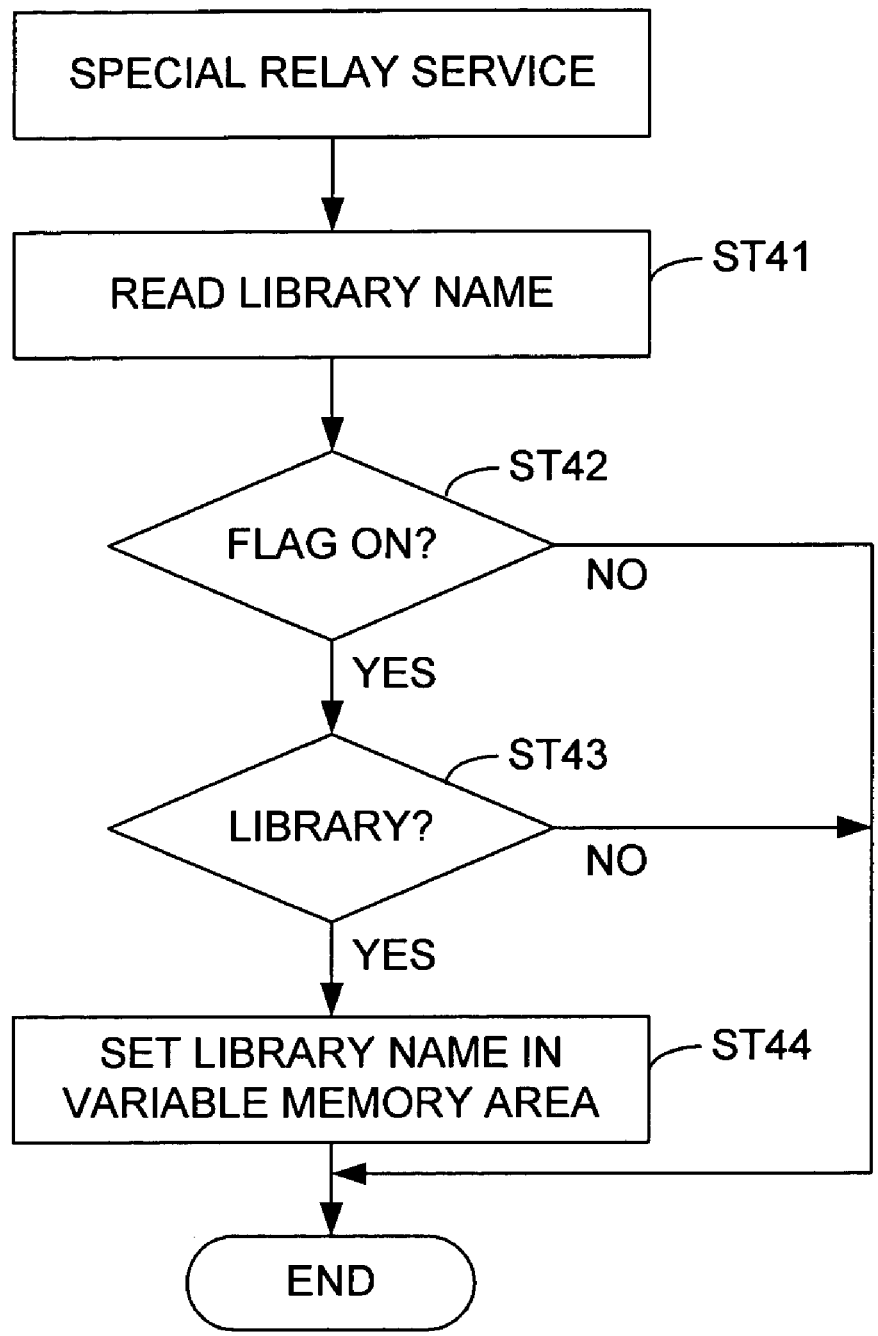
FIG. 11 is a flowchart for explaining the library name reading program.

Portions of a program made into the form of a library are recorded only in the flash memory which cannot be accessed and cannot be read by a tool. Thus, it may become impossible to remember which portions have been made into a library and stored in the flash memory. According to a preferred embodiment of the invention, therefore, the MPU 16 is provided with a function for reading out library names, as shown in FIG. 11. When the user wishes to read out the library names, the tool is used to set a "read-library-name flag" in the variable memory 14*c* of the RAM 14, and the I/O unit 3 carries out a special relay service processing within a cyclic processing. As one of the special relay service processes, the read-library-name flag is checked (Step ST41) and if the flag is ON (YES in Step ST42), the presence of absence of a library is checked (Step ST43). If a library is present (YES in Step ST43), the library name in the flash memory 15 is set at a predetermined area in the variable memory area 14*c* of the RAM 14 (Step ST44). Thus, the user can obtain the library name by using the tool to reference the preliminarily determined area of the RAM 14 and reading it therefrom and learn the content of the program made into the library.

A form of execution making use of these functions of the I/O unit 3 will be explained next. Information that is stored in the RAM 14 or the flash memory 15 of the I/O unit 3 as explained above can be backed up on a memory card (such as a compact flash memory) attached to the CPU unit 2 connected by an inter-unit bus. It goes without saying, however, that the memory card need not be attached to the CPU unit. The I/O unit 3 may be provided with a structure for attaching the memory card or another unit provided with the function of attaching a memory card and controlling the writing or reading of data into and from the RAM 14 and the flash memory 15 of the I/O unit may be installed. Various applications become possible by using any of these units to take (upload) a backup of the program data stored in the RAM 14 and the flash memory 15 of the I/O unit 3. Various applications become possible also by storing (downloading) information stored from a memory card in the RAM 14 and the flash memory 15 of the I/O unit 3.

Libraries stored on the flash memory 15 can be stored on a memory card by using such backup function. If such a memory card is mounted to another programmable controller and the information is downloaded, programs made into these libraries can be incorporated in such another programmable controller. In order to prevent unintended users from making a backup and incorporating such a backup into another programmable controller, the present invention provides a protect function at the time of uploading. A detailed account of this function is explained below.

According to this invention, the uploading operation to a memory card (from a unit to a memory card) is carried out by the user using the tool to store the library ID in the system setting (not shown) of the system memory area 14*b* of the RAM 14 and by a flag operation in the area for the exchange of data between the CPU unit and the I/O unit. As shown in FIG. 12, the backup file format correlates a number with a file name and the flag operation consists of "unit data upload" and "unit data download" such that writing and reading into and from the memory card is effected when the corresponding flag changes from 0 to 1. The status display includes "memory card transmission error" and "transmission busy." These status displays are stored within the unit as data that represent the status of the unit. These stored data may be used to report on the status to an external apparatus (such as a display by an LED) or to make a display on the tool. The flags to be operated for the downloading and uploading to and from the memory card are set at a specified part (such as the variable memory 14*c*) inside the I/O unit 3. It is preferable to set these flags in the area where data are cyclically exchanged between the CPU unit and the I/O unit. In this manner, uploading and downloading operations can be carried out by a flag operation on a specified area of the CPU unit and also from a device (such as a programmable displayer) other than the tool connected to the CPU unit.

The function of uploading to a memory card is executed by the MPU 16 as one of its special relay service processes by writing the following data on a memory card as a set with the library related data:

(1) Header information;
 (2) Backup data (library related data); and
 (3) SUM value.

Before data to be uploaded are written onto the memory card, a file named "unit.prm" (where  indicates the unit number) is created on the memory card and the header information are written in. As shown in FIG. 13, the header information includes the unit format writing the unit type information, the soft version information on the unit and the maximum internal parameter length. The "backup data" in FIG. 13 include the user programs and libraries to be uploaded. The library ID is also stored on the memory card as a backup data item. The header information and the backup data are structured such that they cannot be understood by the tool for creating and editing the user program. Thus, such tool cannot be used to restore the data into the ladder language or into a different language program.

Next, the library ID kept within the flash memory 15 of the I/O unit 3 and the library ID set in the system setting (inputted by the user by using the tool as the uploading operation) are compared. If only they match, the library ID is allowed to be written into the memory card and the process is executed. This serves to prevent a third party from making a copy from a unit loaded with this library onto another memory card and using the uploaded data by downloading the data again (copy protect). In other words, this uploading process can be carried out only by a person who knows the library ID of this library.

In other words, since the library ID is stored in the flash memory 15, it cannot become known even if the I/O unit 3 is accessed. When a library is created, the library ID is stored in the RAM but as Step ST8 of FIG. 4 is executed, the library ID is initialized. Thus, only the proper user knows the library ID and the person who inputs this library ID is interpreted as a proper user and the backup operation to the memory card is allowed. Thus, improper users are prevented from making a backup copy to steal programs made into the library.

On the other hand, since the library ID is preliminarily registered in the RAM 14 in order to check whether a user is a proper user or not, there is the danger of unwittingly allowing it to become known if it is left indefinitely. Thus, the library ID in the RAM 14 is adapted to be erased either after the identity of a proper use has been established or automatically after a certain period of time.

Next, the downloading function (from a memory card to a unit) is explained. The operation of downloading to a unit is carried out by the user operating a specified flag in the relay area assigned to the unit. The actual operation is carried out by the MPU 16 as one of the special relay services. At the time of a downloading operation, the I/O unit 3 starts by reading in the header information from the memory card. If a file with the corresponding file name is not found on the memory card or if the unit type stored in the header data does not match the type of the intended unit, it is concluded that an error has occurred and the process is ended after an error flag is switched ON.

Thus, a library which has once been uploaded as a backup onto the memory card can be downloaded to the I/O unit 3 by following a proper routine. The library may be downloaded to the same I/O unit from which it has been uploaded or to another I/O unit. If it is the same I/O unit 3, the uploaded library is literally a backup copy of the data. When the downloading is to another I/O unit, programs which have already been made into libraries may be made into a package to be utilized for the development and installation of programs in the other I/O unit. For example, makers of programmable controllers and units for programmable controllers as well as users who buy such programmable controllers and units and install them in industrial machines can offer to their customers not only units that incorporate user programs and libraries but also units according to this invention provided with a library-creating means and can also provide backup memory cards to customers who already own a programmable controller. The present invention also allows a single user to download libraries to another I/O unit. Even in such an application, persons not knowing the library ID stored on the memory card cannot use the memory card to make a backup again on the memory card from the I/O unit having the library downloaded to its flash memory 15.

Although the invention was described above as applied to the I/O unit but this is not intended to limit the scope of the invention. It is equally applicable to the CPU unit or another unit. When it is applied to the CPU unit, the basic structure is the same but the CPU unit may not include input and output units, having instead an interface circuit with an inter-unit connecting bus. If the invention is applied to a remote I/O master unit, the input and output circuits explained above in connection with the I/O unit are replaced by an interface circuit with a slave unit for remote input/output. Examples of applicable units include counter units, analog units and position control units which were referred to above. If the invention is applied to a position control unit, the input signal to the input circuit 11 of FIG. 2 is replaced by an analog signal or a pulse signal indicative of a position, the content of the execution of the program becomes the control related to positioning and the output signal from the output circuit becomes a analog or pulse command signal related to the positioning.

The present invention relates also to programmable controllers structured so as to contain each of such units embodying this invention. Moreover, programmable controllers of this invention are not limited to those formed by connecting a plurality of units as described above. Single-unit programmable controllers are also included within the scope of the invention as long as they are provided with the function of creating a library out of a user program. Single-unit programmable controllers are also referred to as micro PLC, containing the functions of a power source unit, a CPU unit and an I/O unit within a single unit case, not separately as independent units.

In summary, the present invention relates to making a library out of a part or whole of a user program created by a user and storing it in another memory device not accessible by the tool such that the program can be dependably protected.

According to this invention, at least a portion of the user program is converted into the form of a library and stored in the second memory device which is not accessible by the tool. As a result, protection can be effected easily and also dependably.

What is claimed is:

1. A unit for a programmable controller, said unit comprising:
   a first memory device that is mounted to said unit and stores a user program;
   a second memory device mounted to said unit;
   library-creating means for creating a library out of at least a portion of said user program and storing said library in said second memory device; and
   program-executing means for executing a program made into said library stored in said second memory device;
   wherein said second memory device is inaccessible by a tool that uploads said user program.

2. The unit of claim 1 wherein said library-creating means creates an execution object out of said user program and stores said execution objects in said second memory device.

3. The unit of claim 1 wherein said program made into a library is a subroutine library and said program-executing means executes said subroutine library when there is a dedicated command in a main user program stored in said first memory device for calling said subroutine library and returns to said main user program.

4. The unit of claim 1 wherein said program made into a library is the whole of said user program and said program-executing means sets said program made into a library and stored in said second memory device in an executable condition.

5. The unit of claim 1 wherein said library-creating means serves to store in said second memory device a library name for specifying a program to be made into a library in correlation with said program to be made into a library, said library-creating means also serving to read out said library name stored in said second memory means and including library name reading means for reading out a library name stored in said first memory device.

6. The unit of claim 1 wherein said library-creating means serves to store in said second memory device library ID data for specifying a library in correlation with a program which has been made into said library, said library-creating means comprising backup means for backing up said data stored in said second memory device in an external memory device, said backup means serving to determine whether inputted library ID data match preliminarily stored proper data or not and to store said inputted library ID data only if said inputted library ID data match said preliminarily stored proper data.

7. A programmable controller comprising:
   a first memory device that is mounted to said programmable controller and stores a user program;
   a second memory device mounted to said programmable controller;
   library-creating means for creating a library out of at least a portion of said user program and storing said library in said second memory device; and
   program-executing means for executing a program made into said library stored in said second memory device;
   wherein said second memory device is inaccessible by a tool that uploads said user program.

8. A method of processing a user program, said method comprising the steps of:
   storing said user program in a first memory device of a programmable controller, said programmable controller including a second memory device not accessible by a tool that uploads said user program;

making at least a portion of said user program stored in said first memory device into a library and protecting the program made into said library by storing in said second memory device; and causing the program made into said library and stored in said second memory device to be executed whenever required while said user program is executed.

9. A unit for a programmable controller including an input circuit for receiving an input signal, program-executing means for executing a user program based on said input signal and an output circuit for outputting results of executing said user program, said unit comprising:

a first memory mounted to said unit and storing a user program; and a second memory mounted to said unit and preliminarily storing a program made into a part library, said user program being created by a tool and having inserted therein a dedicated command for calling and executing said program made into a part library, said program-executing means serving to scan said user program stored in said first memory device, to call and execute said program made into a part library by executing said dedicated command in said user program and to return to and execute said user program after calling said program, said second memory being made inaccessible by said tool such that said program made into a part library is not accessible.

10. A unit for a programmable controller including an input circuit for receiving an input signal, program-executing means for executing a user program based on said input signal and an output circuit for outputting results of executing said user program, said unit comprising:

a first memory mounted to said unit and storing a flag, said flag being stored in said first memory by operating a tool; and a second memory mounted to said unit and preliminarily storing a program made into a total library, said flag causing said program made into a total library to be called and executed, said program-executing means serving to call and execute said program made into a total library in said second memory device according to said flag in said first memory, said second memory being made inaccessible by said tool such that said program made into a total library is not accessible.

11. A unit for a programmable controller, said unit comprising:

a first memory device mounted to said unit and storing a user program which is created by a tool and has a dedicated command inserted therein for calling and executing a program made into a library;

a second memory device mounted to said unit and preliminarily storing said program made into a library; and program-executing means for scanning and executing said user program and executing said program made into a library by using said dedicated command from said first memory device to call said program made into a library;

wherein said program made into library is preliminarily stored in said second memory device and is protected by being made inaccessible by said tool used when said user program was created.

12. A unit for a programmable controller, said unit comprising:

a first memory device mounted to said unit and storing a flag set by a tool;

a second memory device mounted to said unit and preliminarily storing a program made into a library; and program-executing means for reading said flag stored in said first memory and calling said program made into a library from said second memory device to execute if said flag is set to indicate that said program should be executed;

wherein said program made into library is preliminarily stored in said second memory device and is protected by being made inaccessible by said tool used for setting said flag.

* * * * *